US009036658B2

United States Patent
Koo et al.

(10) Patent No.: US 9,036,658 B2
(45) Date of Patent: May 19, 2015

(54) APPARATUS AND METHOD FOR TRANSMITTING/RECEIVING DATA IN COMMUNICATION SYSTEM

(71) Applicant: Electronics and Telecommunications Research Institute, Daejeon (KR)

(72) Inventors: Kijong Koo, Daejeon (KR); Doyoung Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 188 days.

(21) Appl. No.: 13/931,150

(22) Filed: Jun. 28, 2013

(65) Prior Publication Data

US 2014/0010242 A1    Jan. 9, 2014

(30) Foreign Application Priority Data

Jun. 29, 2012  (KR) .......................... 10-2012-0070682
Jun. 27, 2013  (KR) .......................... 10-2013-0074677

(51) Int. Cl.
*H04J 3/24*    (2006.01)
*H04L 1/00*    (2006.01)
*H04L 29/06*   (2006.01)

(52) U.S. Cl.
CPC .......... *H04L 1/0006* (2013.01); *H04L 29/0653* (2013.01)

(58) Field of Classification Search
None
See application file for complete search history.

(56) References Cited

U.S. PATENT DOCUMENTS 5,870,412 A * 2/1999 Schuster et al. ............. 714/752
7,159,235 B2 * 1/2007 Son et al. .................... 725/91

FOREIGN PATENT DOCUMENTS

KR    10-2001-0038203 A    5/2001

* cited by examiner

*Primary Examiner* — Afshawn Towfighi

(57) ABSTRACT

An apparatus for transmitting data in a communication system includes: a receiving unit configured to receive connection information of network systems to which a terminal connects; a packet generation unit configured to check the connection information, generate a data packet having a first structure when the terminal connects to a first system, and generate a data packet having a second structure when the terminal connects to a second system; and a transmitting unit configured to transmit the data packets to a receiver. The data packet having the first structure includes successive sequence frames, and the data packet having the second structure includes a main frame including the sequence frames, a redundancy frame obtained by delaying the sequence of the sequence frames, and an exclusive OR (XOR) frame of the main frame.

20 Claims, 6 Drawing Sheets

APPARATUS AND METHOD FOR TRANSMITTING/RECEIVING DATA IN COMMUNICATION SYSTEM

CROSS-REFERENCE(S) TO RELATED APPLICATIONS

The present application claims priority of Korean Patent Application Nos. 10-2012-0070682 and 10-2013-0074677, filed on Jun. 29, 2012, and Jun. 27, 2013, respectively, which are incorporated herein by reference in their entirety.

BACKGROUND OF THE INVENTION

1. Field of the Invention

Exemplary embodiments of the present invention relate to a communication system; and, more particularly, to an apparatus and method for normally transmitting/receiving data by recovering a data packet loss, in order to improve the quality of multimedia services in an all-Internet protocol (hereafter referred to as 'IP') network based on wireless communication.

2. Description of Related Art

In current communication systems, research has been actively conducted to provide various qualities of services (hereafter, referred to as 'QoS') of services having a high transmission rate to users. Examples of the communication systems may include a wireless local area network (hereafter, referred to as 'WLAN') system. With the development of mobile communication technology and the emergence of smart phones, terminals have been able to provide various multimedia services such as Internet connections, mails, voices, and images using a packet network.

Furthermore, in a communication system which provides multimedia services through terminals as described above, various real-time multimedia services have been made possible through the performance improvement of terminals and the enhancement of networks, for example, the bandwidth expansion of networks and the improvement in transmission rates of networks. However, due to the fundamental problem of the IP network which cannot guarantee the QoS as well as the increase in the number of users who are intended to receive multimedia services and the increase in the amount of data based on image data with a high quality, transmit (Tx) data may be delayed or lost even in an enhanced network.

Furthermore, the delay or loss of data in the real-time multimedia service may cause a reduction in service quality for users who are intended to receive the multimedia service. Thus, various methods have been proposed to minimize a data loss corresponding to a main factor of the reduction in service quality. For example, a loss recovery method using a forward error correction code, a transmission control method through quality or loss feedback, a congestion avoidance method and the like have been proposed. However, the proposed methods have a limitation in data recovery performance and speed, when data are recovered in a communication system which transmits/receives large-volume data to provide the multimedia service.

Thus, there is a demand for a method for recovering lost data to transmit/receive normal data at high speed, in order to improve the quality of a multimedia service in a communication system which provides the multimedia service. Furthermore, there is a demand for a method for recovering lost data to efficiently transmit/receive data, when a terminal connects to heterogeneous networks or systems so as to receive a multimedia service.

SUMMARY OF THE INVENTION

An embodiment of the present invention is directed to an apparatus and method for transmitting/receiving data in a communication system.

Another embodiment of the present invention is directed to an apparatus and method for recovering a data packet loss to normally transmitting/receiving data at high speed, in order to improve the quality of multimedia services in a communication system.

Another embodiment of the present invention is directed to an apparatus and method for transmitting/receiving data, which efficiently recovers a lost data packet to improve transmission/reception efficiency of data, when a terminal connects to heterogeneous networks or systems to the receive a multimedia service in a communication system.

Another embodiment of the present invention is directed to an apparatus and method for transmitting/receiving data, which transmits/receives network information of a network to which a terminal connects, when the terminal connects to heterogeneous networks or systems to perform multimedia communication, and adaptively recovers a data packet lost during the multimedia communication according to the network, thereby improving recovery performance for the lost data packet.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, an apparatus for transmitting data in a communication system includes: a receiving unit configured to receive connection information of network systems to which a terminal connects; a packet generation unit configured to check the connection information, generate a data packet having a first structure when the terminal connects to a first system, and generate a data packet having a second structure when the terminal connects to a second system; and a transmitting unit configured to transmit the data packets to a receiver. The data packet having the first structure includes successive sequence frames, and the data packet having the second structure includes a main frame including the sequence frames, a redundancy frame obtained by delaying the sequence of the sequence frames, and an exclusive OR (XOR) frame of the main frame.

In accordance with another embodiment of the present invention, an apparatus for receiving data in a communication system includes: a receiving unit configured to receive a data packet, generated in response to network systems to which a terminal connects, from a transmitter; a checking unit configured to check control information contained in a header of the data packet and information on a plurality of frames contained in a payload of the data packet; a decoder configured to decode the plurality of frames contained in the payload; and a restoring unit configured to restore the data transmitted from the transmitter through the decoded frames, wherein the receiving unit receives the data packet including successive sequence frames when the terminal connects to a first system, and receives the data packet including a main frame including the sequence frames, a redundancy frame obtained by delaying the sequence of the sequence frames, and an XOR frame of the main frame when the terminal connects to a second system.

In accordance with another embodiment of the present invention, a method for transmitting/receiving data in a communication system includes: receiving connection information of network systems to which a terminal connects; checking the connection information and dynamically generating a data packet in response to the connection of the terminal to the network systems; and transmitting the data packet to a receiver. Said checking the connection information and dynamically generating the data packet in response to the connection of the terminal to the network system includes: generating the data packet containing successive sequence frames when the terminal connects to a first system; and generating the data packet containing a main frame including the sequence frames, a redundancy frame obtained by delaying the sequence of the sequence frames, and an XOR frame of the main frame, when the terminal connects to a second system.

BRIEF DESCRIPTION OF THE DRAWINGS

FIGS. 3 to 5 are diagrams schematically illustrating the frame structure of a data packet in the communication system in accordance with the embodiment of the present invention.

DESCRIPTION OF SPECIFIC EMBODIMENTS

Figure 1:
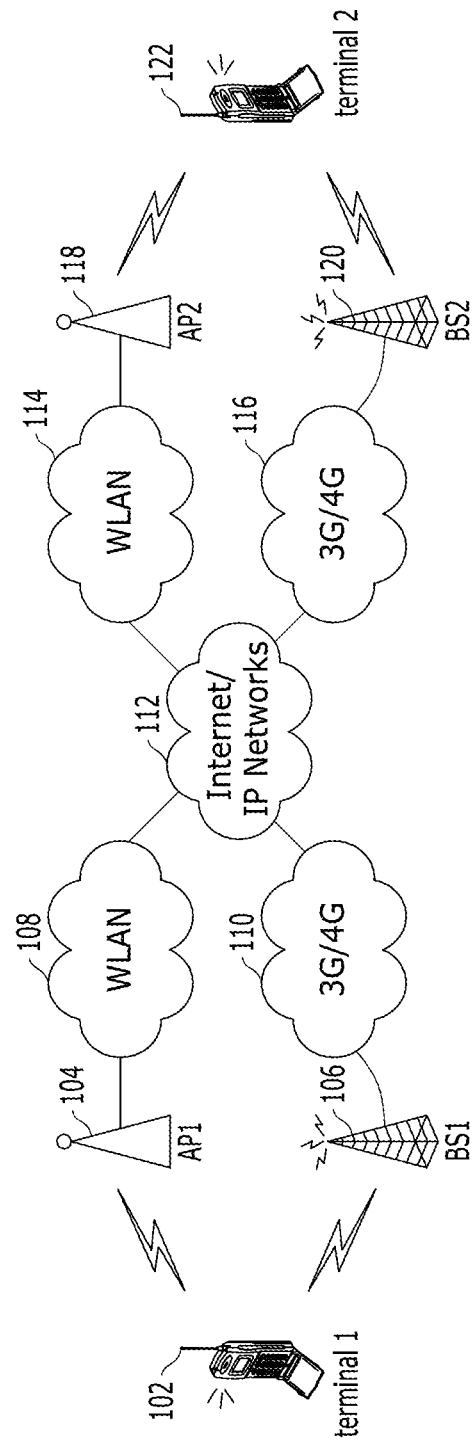
FIG. 1 is a diagram schematically illustrating the architecture of a communication system in accordance with an embodiment of the present invention.

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The exemplary embodiments of the present invention provide an apparatus and method for transmitting/receiving data in a communication system which provides a multimedia service, for example. In the embodiments of the present invention, a communication system including an all-IP network based on wireless communication, for example, a WLAN system or mobile communication network system will be taken as an example for description. However, the apparatus and method for transmitting/receiving data in accordance with the embodiments of the present invention may be applied to other communication systems.

In the embodiments of the present invention, when a terminal connects to heterogeneous networks or systems, for example, a WLAN system as a first system or a mobile communication system as a second system and receives a multimedia service, the apparatus and method may dynamically generate a data packet and transmit/receive the generated data packet, according to the network or system to which the terminal connects. Furthermore, the apparatus and method adaptively recovers a lost data packet when the data packet is transmitted/received, thereby improving the recovery performance for the lost data packet and the transmission/reception efficiency of the data packet. In other words, the apparatus and method dynamically generates a data packet in different manners depending on the heterogeneous networks or systems to which the terminal connects. Furthermore, the apparatus and method adaptively recovers a lost data packet when the generated data packet is transmitted/received. That is, the apparatus and method applies different packet loss recovery methods depending on the heterogeneous networks or systems to which the terminal connects, in order to recover the lost data packet.

In the embodiments of the present invention, when the terminal connects to a WLAN system so as to receive a multimedia service, a frame containing data corresponding to the multimedia service is transmitted/received as one data packet between the terminal and an access point (hereafter, referred to as 'AP') of the WLAN system in response to the connection of the terminal to the WLAN system. In particular, the apparatus and method generates sequence frames of the data corresponding to the multimedia service and one data packet containing the sequence frames. During a call setup for the connection of the terminal to the WLAN system, the apparatus and method checks information on the connection of the terminal to the WLAN system and data packet reception information of the terminal which connects to the WLAN system to receive a data packet. Then, the apparatus and method generates the sequence frames and the data packet containing the sequence frames and transmits/receives the data packet.

In the embodiments of the present invention, when the terminal connects to a mobile communication network system so as to receive a multimedia service, a plurality of frames containing data corresponding to the multimedia service are transmitted/received as one data packet between the terminal and a base station (hereafter, referred to as 'BS') of the mobile communication network system, in response to the connection of the terminal to the mobile communication network system. In particular, the apparatus and method transmits/receives a main frame of data corresponding to the multimedia service and a redundancy frame of the main frame as one data packet. At this time, during a call setup for the connection of the terminal to the mobile communication system, the apparatus and method checks information on the connection of the terminal to the mobile communication network and data packet reception information of the terminal which connects to the mobile communication network system to receive a data packet. Then, the apparatus and method generates the main frame, the redundancy frame, and an exclusive OR (XOR) frame of the main frame, and transmits/receives the main frame, the redundancy frame, and the XOR frame as one data packet.

Furthermore, in the embodiments of the present invention, when a communication system provides a real-time multimedia service, the apparatus and method recovers a data packet loss, which may occur when the real-time multimedia service data are transmitted/received, thereby normally transmitting/receiving large-volume data at high speed. At this time, the apparatus and method transmits/receives a plurality of frames containing data corresponding to the real-time multimedia service as one data packet, for example, a real-time transport protocol (hereafter, referred to as 'RTP) packet. That is, the apparatus and method dynamically generates frames of data corresponding to the real-time multimedia service, for example, sequence frames of the data or a main frame, a redundancy frame, and an XOR frame, according to heterogeneous networks or systems to which a terminal connects. Then, the apparatus and method generates one RTP packet containing the generated sequence frames or one RTP packet containing the main frame, the redundancy frame, and the XOR frame, and transmits/receives the generated RTP packet. Now, referring to FIG. 1, a communication system in accordance with an embodiment of the present invention will be described in detail.

FIG. 1 is a diagram schematically illustrating the architecture of a communication system in accordance with an embodiment of the present invention.

Referring to FIG. 1, the communication system includes a plurality of terminals, WLAN systems 108 and 114, 3G/4G systems 110 and 116 as mobile communication network systems, APs 104 and 118 of the WLAN systems 108 and 114, BSs 106 and 120 of the 3G/4G systems 110 and 116, and an Internet/IP network 112. The plurality of terminals are intended to receive a multimedia service, and includes a first terminal 102 and a second terminal 122. The WLAN systems 108 and 114 and the 3G/4G systems 110 and 116 of the mobile communication network system are heterogeneous networks or systems to which the terminals 102 and 122 connect to receive a multimedia service. The APs 104 and 118 of the WLAN systems 108 and 114 and the BSs 106 and 120 of the 3G/4G systems 110 and 116 are configured to transmit/receive a data packet corresponding to the multimedia service to/from the terminals 102 and 122. The Internet/IP network 112 connects the WLAN systems 108 and 114 and the 3G/4G systems 110 and 116.

When the terminals 102 and 122 connect to the WLAN systems 108 and 114 or the 3G/4G systems 110 and 116 so as to receive a multimedia service, the communication system generates frames of data corresponding to the multimedia service and a data packet containing the data frames, in response to information on the connection of the terminals 102 and 122 to the WLAN systems 108 and 114 or the 3G/4G systems 110 and 116, and the terminals 102 and 112 and the APs 104 and 118 or the BSs 106 and 120 the data packet to/from each other.

For example, when the terminals 102 and 122 connect to the WLAN systems 108 and 114 so as to receive the multimedia service, the communication system generates sequence frames of data corresponding to the multimedia service and one data packet containing the sequence frames, and the terminals 102 and 122 and the APs 104 and 118 transmit/receive the data packet to/from each other. Furthermore, when the terminals 102 and 122 connect to the 3G/4G systems 110 and 116 so as to receive the multimedia service, the communication system generates a main frame of data corresponding to the multimedia service, a redundancy frame, and an XOR frame, and then generates one data packet containing the main frame, the redundancy frame, and the XOR frame, and the terminals 102 and 122 and the BSs 106 and 120 transmit/receive the data packet to/from each other. Now, referring to FIG. 2, a data packet which is transmitted/received by a data transmitter/receiver in the communication system in accordance with the embodiment of the present invention will be described in detail.

Figure 2:
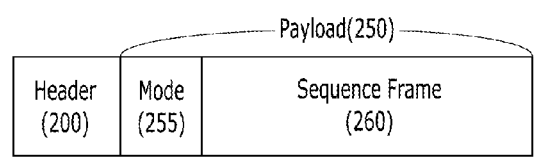
FIGS. 2 and 4 are diagrams schematically illustrating a data packet structure in the communication system in accordance with the embodiment of the present invention.

FIG. 2 is a diagram schematically illustrating a data packet structure in the communication system in accordance with the embodiment of the present invention. FIG. 2 schematically illustrates the structure of an RTP packet containing sequence frames of data corresponding to a real-time multimedia service.

Referring to FIG. 2, the data packet includes a header 220 and a payload 250. The header 200 contains control information on the data packet, and the payload 250 contains data corresponding to a multimedia service. The header 200 of the data packet contains all control information required for a receiver to recover the data of the multimedia service, contained in the payload 250 of the data packet, when the receiver receives the data packet.

Furthermore, the payload 250 of the data packet includes data frames containing data corresponding to the multimedia service. When the terminal connects to a 3G/4G system as a mobile communication network system so as to receive the multimedia service, the data frames are transmitted/received as one data packet in response to the information on the connection of the terminal to the 3G/4G system, which is transmitted/received during a call setup for the 3G/4G system. That is, the payload 250 of the data packet includes a sequence frame 260 as a data frame containing data corresponding to the multimedia service. Furthermore, the payload 250 of the data packet includes a mode field 255 containing information of the frames included in the payload 250 of the data packet. That is, the mode field 255 contains information indicating the number of frames included in the payload 250 and information indicating that the sequence frame 260 is included in the payload 250 of the data packet, as field information.

For example, a transmitter transmitting the data packet receives connection information from a receiver, checks the connection information to generate the sequence frame 260, includes the sequence frame 260 in the payload 250, and includes information on the sequence frame 260, contained in the payload 250, for example, the number information of the sequence frame 260 in the mode field 255.

The connection information is transmitted to the transmitter during a call setup, when the terminal connects to a 3G/4G system as the mobile communication network system. Then, when the receiver receives a data packet from the transmitter, the receiver transmits data packet reception information to the transmitter. At this time, the data packet reception information contains data packet loss information of the receiver on the data packet received by the receiver, that is, a loss ratio. When the receiver transmits the data packet as illustrated in FIG. 2 to the transmitter, the data packet reception information is included in the mode field 255 and then transmitted to the transmitter. That is, the mode field 255 not only includes the information on the number of sequence frames contained in the payload 250, but also includes data packet reception information received from the receiver, that is, loss information, when the transmitter transmitting a data packet containing the mode field 255 receives the data packet from the receiver, as the field information.

The receiver checks control information contained in the header 200 of the data packet, and recovers data corresponding to the multimedia service, contained in the payload 250. At this time, the receiver checks the size of the payload 250 through the header 200, and checks the number of sequence frames contained in the payload 250 through the mode field 255. Thus, the receiver checks the length of the sequence frame 260 contained in the payload 250 through the size of the payload 250 and the number of sequence frames. The receiver having received the data packet includes a plurality of frames, containing data to be transmitted to the transmitter, in the payload 250 and then transmits one data packet, like the transmitter. At this time, the receiver includes the number information of sequence frames contained in the payload 250 and the data packet reception information of the receiver, that is, the loss information in the mode field 255 and then transmits the data packet. Now, referring to FIG. 3, the sequence frames contained in the payload of the data packet which is transmitted/received by the data transmitter/receiver in the communication system in accordance with the embodiment of the present invention will be described in more detail.

Figure 3:
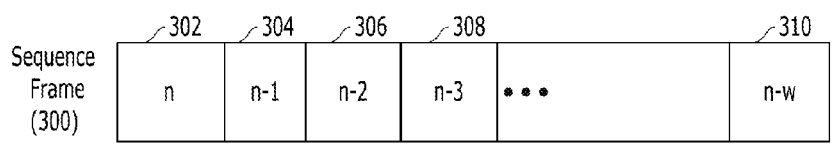

FIG. 3 is a diagram schematically illustrating the frame structure of a data packet in the communication system in accordance with the embodiment of the present invention. FIG. 3 schematically illustrates the structure of sequence frames contained in a payload of the data packet.

Referring to FIG. 3, when a terminal connects to a 3G/4G system as a mobile communication network system so as to receive a multimedia service in the communication system, a transmitter generates data corresponding to the multimedia service as a plurality of sequence frames each having a sequence number, constructs the plurality of sequence frames containing the data corresponding to the multimedia service as one data packet, and transmits the data packet.

More specifically, a sequence frame 300 contained in the data packet includes a plurality of sequence frames each having an arbitrary sequence number, for example, an n-th sequence frame 302, an (n−1)-th sequence frame 304, an (n−2)-th sequence frame 306, an (n−3)-th sequence frame 308, . . . , an (n−w)-th sequence frame 310.

Here, n is an integer (=1, 2, 3, . . . ) indicating the sequence number of a frame containing data which are sequentially generated for the real-time multimedia service, when the terminal of the communication system connects to the 3G/4G system as a mobile communication network system so as to receive the multimedia service. Furthermore, w is an integer (=1, 2, 3, . . . ) indicating a sequence delay value for the plurality of sequence frames. The sequence delay value w is set according to the data packet reception information of the receiver, received through a mode field. Furthermore, the sequence delay value w is set according to a data packet loss ratio of the receiver, in order to improve the recovery performance for a lost data packet which may occur when the data packet is transmitted/received.

The transmitter in the communication system generates the plurality of sequence frames 302, 304, 306, 308, and 310, that is, the sequence frame 300 of the data corresponding to the multimedia service, generates a data packet containing the sequence frame 300, and transmits the generated data packet to the receiver. The receiver decodes the data packet and recovers a lost data packet. In other words, the receiver decodes the sequence frame 300 included in the payload of the data packet, and recovers a sequence frame lost in the sequence frame 300, thereby restoring the data corresponding to the multimedia service. Now, referring to FIG. 4, the data packet which is transmitted/received by the data transmitter/receiver in the communication system in accordance with the embodiment of the present invention will be described in more detail.

Figure 4:
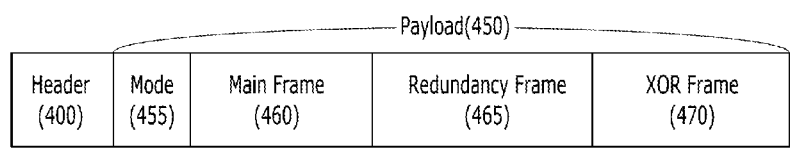

FIG. 4 is a diagram schematically illustrating a data packet structure in the communication system in accordance with the embodiment of the present invention. FIG. 4 schematically illustrates the structure of an RTP packet including a plurality of frames containing data corresponding to a real-time multimedia service.

Referring to FIG. 4, the data packet includes a header 400 and a payload 450. The header 400 contains control information on the data packet, and the payload 450 contains data corresponding to a multimedia service. The header 400 of the data packet contains all control information required for the receiver to recover the data of the multimedia service, contained in the payload 450 of the data packet, when the receiver receives the data packet.

The payload 450 of the data packet includes a data frame containing the data corresponding to the multimedia service. When the terminal connects to a WLAN system to receive the multimedia service, the data frame is transmitted/received as one data packet, in response to information on the connection of the terminal to the WLAN system, which is transmitted/received during a call setup for the WLAN system. The payload 450 of the data packet includes a main frame 460 of the data corresponding to the multimedia service and a redundancy frame 465 of the main frame 460. Furthermore, the payload 450 includes an XOR frame 470 of the main frame 460 according to data packet reception information received from a receiver. Furthermore, the payload 450 of the data packet includes a mode field 455 containing information on frames contained in the payload 450 of the data packet. That is, the mode field 455 contains information indicating the number of frames contained in the payload 450 and information indicating that the main frame 460, the redundancy frame 645, and the XOR frame 470 are contained in the payload 450 of the data packet, as field information.

For example, the transmitter transmitting the data packet receives the connection information from the receiver, checks the connection information, generates the main frame 460, the redundancy frame 465, and the XOR frame 470, and then includes the main frame 460, the redundancy frame 465, and the XOR frame 470 in the payload 460. Then, the transmitter includes information on the frames 460, 465, and 470 included in the payload 450, for example, information on the number of frames 460, 465, and 470 into the mode field 455.

The connection information is transmitted to the transmitter during a cell setting, when the terminal connects to the WLAN system. Then, when the receiver receives the data packet from the transmitter, the receiver transmits data packet reception information to the transmitter. At this time, the data packet reception information contains data packet loss information of the receiver on the data packet received by the receiver, that is, a loss ratio. When the receiver transmits the data packet as illustrated in FIG. 4 to the transmitter, the data packet loss information is included in the mode field 455 and then transmitted to the transmitter. That is, the mode field 455 includes the data packet reception information, that is, loss information as well as the information on the number of frames contained in the payload 450, as the field information. The data packet reception information is received from the receiver when the transmitter transmitting the data packet including the mode field 455 receives a data packet from the receiver.

Then, the transmitter checks the data packet reception information contained in the mode field 455 of the data packet received from the receiver. When the loss ratio of the data packet in the receiver is smaller than a threshold value, the transmitter includes the main frame 460 and the redundancy frame 465 into the payload 450, and when the loss ratio of the data packet in the receiver is larger than the threshold value, the transmitter includes the main frame 460, the redundancy frame 465, and the XOR frame 470 into the payload 450, and then transmit the data packet to the receiver. At this time, the mode field 455 contains information on the number of frames contained in the payload 450 and data packet reception information of the transmitter, that is, loss information.

The receiver checks the control information contained in the header 400 of the data packet, and restores data corresponding to the multimedia service, contained in the payload 450. At this time, the receiver checks the size of the payload 450 through the header 400, and checks the number of frames contained in the payload 450 through the mode field 455. Thus, the receiver checks the lengths of the frames contained in the payload 450 through the size of the payload 450 and the number of frames. The frames contained in the payload 450 have the same size. The receiver having received the data packet includes a plurality of frames, containing data to be transmitted to the transmitter, into the payload 450 and transmits the frames as one data packet, like the transmitter. At this time, the receiver includes the information on the number of frames contained in the payload 450 and the data packet reception information of the receiver, that is, the loss information into the mode field 455, and then transmits the data packet. Now, referring to FIG. 5, the plurality of frames contained in the payload of the data packet which is transmitted/received by the data transmitter/receiver in the communication system in accordance with the embodiment of the present invention will be described in more detail.

Figure 5:
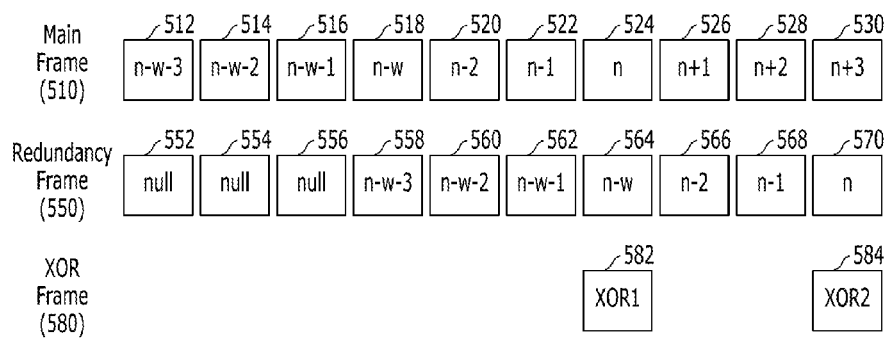

FIG. 5 is a diagram schematically illustrating the structures of frames of a data packet in the communication system in accordance with the embodiment of the present invention. FIG. 5 schematically illustrates the structures of a main frame, a redundancy frame, and an XOR frame contained in a payload of the data packet.

Referring to FIG. 5, when a terminal connects to a WLAN system so as to receive a multimedia service in the communication system, a transmitter generates data corresponding to the multimedia service as a plurality of frames each having a sequence number. In other words, the transmitter generates a data packet frame having an n-th (n=7) sequence frame, for example, a voice frame or video frame, constructs a plurality of frames containing data corresponding to the multimedia service as one data packet, and then transmits the data packet.

That is, the transmitter generates a main frame 510 of the data corresponding to the multimedia service, a redundancy frame 550, and an XOR frame 580, and transmits a data packet including the main frame 510, the redundancy frame 550, and the XOR frame 580 to a receiver, in order for the terminal to connect to the WLAN system and receive the multimedia service. When a loss ratio of the data packet in the receiver is smaller than a threshold value, the transmitter includes the main frame 510 and the redundancy frame 550 into a payload of the data packet and transmits the frames as one data packet. When the loss ratio of the data packet in the receiver is greater than the threshold value, the transmitter includes the main frame 510, the redundancy frame 550, and the XOR frame 580 into the payload and transmits the frames as one data packet. At this time, the mode field of the payload contains information on the number of frames contained in the payload and data packet reception information of the transmitter, that is, loss information.

More specifically, the main frame 510 includes a plurality of sequence frames each having an arbitrary sequence number. For example, the main frame 510 includes an (n−w−3)-th (first) sequence frame 512, an (n−w−2)-th (second) sequence frame 514, an (n−w−1)-th (third) sequence frame 516, an (n−w)-th (fourth) sequence frame 518, an (n−2)-th (fifth) sequence frame 520, an (n−1)-th (sixth) sequence frame 522, an n-th (seventh) sequence frame 524, an (n+1)-th (eighth) sequence frame 526, an (n+2)-th (ninth) sequence frame 528, and an (n+3)-th (tenth) sequence frame 530.

Here, n is an integer (=1, 2, 3, . . . ) indicating the sequence number of a frame containing data which are sequentially generated for the real-time multimedia service, when the terminal of the communication system connects to the WLAN system to receive the multimedia service. In the embodiment of the present invention, suppose that n is 7, for convenience of description.

Furthermore, w is an integer (=1, 2, 3, . . . ) indicating a sequence delay value between the main frame 210 and the redundancy frame 250. The sequence delay value w is set according to data packet reception information of the receiver, received through a mode field. Furthermore, the sequence delay value w is set according to the loss ratio of the data packet in the receiver, in order to improve recovery performance for a lost data packet which may occur when the data packet is transmitted/received. For example, when the loss ratio of the data packet in the receiver is smaller than the threshold value, w is set to a value smaller than w which is set when a previous data packet is transmitted/received, and when the loss ratio of the data packet in the receiver is greater than the threshold value, w is set to a value greater than w which is set when the previous data packet is transmitted/received.

The sequence delay value w is transmitted to the receiver through the mode field of the payload. As described above, the receiver checks the size of the payload, the number of frames, and the length of the frames through the header of the data packet the information contained in the mode field of the payload, recognizes start points of the respective frames in the payload through the sequence delay value w, and then decodes the frames. That is, the receiver recognizes the start point of a main frame, the start point of a redundancy frame, and the start point of an XOR frame in the payload of the data packet through the size of the payload, the number of frames, the length of the frames, and the sequence delay value w, and normally decodes the main frame, the redundancy frame, and the XOR frame, thereby recovering a lost data packet. Thus, the receiver normally recovers the data transmitted by the transmitter.

The redundancy frame 550 includes a plurality of sequence frames having a sequence delay value w (=3) for the main frame 510 which has arbitrary n (=7) sequence numbers. For example, the redundancy frame 550 includes an (n−w−3)-th (first) sequence frame 558, an (n−w−2)-th (second) sequence frame 560, an (n−w−1)-th (third) sequence frame 562, an (n−w)-th (fourth) sequence frame 564, an (n−2)-th (fifth) sequence frame 566, an (n−1)-th (sixth) sequence frame 568, and an n-th (seventh) sequence frame 570. Furthermore, the redundancy frame 550 includes null frames 552, 554, and 556 corresponding to the (n−w−3)-th sequence frame 512, the (n−w−2)-th sequence frame 514, and the (n−w−1)-th sequence frame 516 in the main frame 510. That is, since the sequence delay value w is 3, the sequence frames of the main frame 510 after the w-th (third) sequence frame of the main frame 510 exist in the redundancy frame 550.

The XOR frame 580 includes frames obtained by performing an XOR operation on the main frame 510 having arbitrary n (=7) sequence numbers. For example, the XOR frame 580 includes an XOR1 frame 582 obtained by performing an XOR operation on the (n−w−3)-th sequence frame 512, the (n−w−2)-th sequence frame 514, and the (n−w−1)-th sequence frame 516 of the main frame 510 and an XOR2 frame 584 obtained by performing an XOR operation on the (n−w)-th sequence frame 518, the (n−2)-th sequence frame 520, and the (n−1)-th sequence frame 522 of the main frame 510.

Thus, when the transmitter transmits a data packet frame having an n-th (seventh) sequence number, the transmitter includes the n-th sequence frame 524 of the main frame 510, the (n−w)-th sequence frame 564 of the redundancy frame 550, and the XOR1 frame 582 of the XOR frame 580 into a payload of a data packet, and constructs one data packet. At this time, a mode field of the payload contains information indicating that the above-described three frames are included in the payload, that is, information on the number of frames. When the transmitter transmits the n-th data packet frame, the transmitter generates one data packet including the main frame 510 of the n-th sequence frame 524, the redundancy frame 550 of the (n−w)-th sequence frame 564, and a result obtained by performing an XOR operation on the (n−w−3)-th sequence frame 512, the (n−w−2)-th sequence frame 514, and the (n−w−1)-th sequence frame 516 of the main frame 510, that is, the XOR frame 580 of the XOR1 frame 582, and transmits the generated data packet.

Furthermore, when the transmitter transmits a data packet frame having an (n+1)-th (eighth) sequence number, the transmitter includes the (n+1)-th sequence frame 526 of the main frame 510 and the (n−2)-th sequence frame 566 of the redundancy frame 550 into a payload of a data packet, and constructs one data packet. At this time, a mode field of the payload contains information indicating that the above-described two frames are included in the payload, that is, information on the number of frames. When the transmitter transmits the (n+1)-th data packet frame, the transmitter generates one data packet including the main frame 510 of the (n+1)-th sequence frame 526 and the redundancy frame 550 of the (n−2)-th sequence frame 566, and transmits the generated data packet.

Furthermore, when the transmitter transmits a data packet frame having an (n+2)-th (ninth) sequence number, the transmitter includes the (n+2)-th sequence frame 528 of the main frame and the (n−1)-th sequence frame 568 of the redundancy frame 550 into a payload of a data packet, and constructs one data packet. At this time, a mode field of the payload contains information indicating that the above-described two frames are included in the payload, that is, information on the number of frames. When the transmitter transmits the (n+2)-th data packet frame, the transmitter generates one data packet including the main frame 510 of the (n+2)-th sequence frame 528 and the redundancy frame 550 of the (n−1)-th sequence frame 568 and transmits the generated data packet.

Furthermore, when the transmitter transmits a data packet frame having an (n+3)-th (tenth) sequence number, the transmitter includes the (n+3)-th sequence frame 530 of the main frame 510, the n-th sequence frame 570 of the redundancy frame 550, and the XOR2 frame 584 of the XOR frame 580 into a payload of a data packet, and constructs one data packet. At this time, a mode field of the payload contains information indicating that the above-described three frames are contained in the payload, that is, information on the number of frames. When the transmitter transmits the (n+3)-th data packet frame, the transmitter generates one data packet including the main frame 510 of the (n+3)-th sequence frame 530, the redundancy frame 550 of the n-th sequence frame 570, and a result obtained by performing an XOR operation on the (n−w)-th sequence frame 518, the (n−2)-th sequence frame 520, and the (n−1)-th sequence frame 522 of the main frame 510, that is, the XOR frame of the XOR2 frame 584, and transmits the generated data packet.

When the transmitter transmits a data packet including the main frame 510 and the redundancy frame 550 in a payload or transmits a data packet including the main frame 510, the redundancy frame 550, and the XOR frame 580 in the payload, the receiver checks the frames included in the payload and receives data corresponding to a multimedia service, transmitted by the transmitter. As described above, the receiver checks control information on the payload through a header of the data packet, and checks information on the number of frames, contained in the mode field of the payload.

Then, the receiver decodes the main frame 510 contained in the payload and restores the data transmitted from the transmitter. At this time, when a predetermined sequence frame is lost in the decoded main frame, the receiver recovers the lost sequence frame, that is, a lost data packet through the redundancy frame 550, thereby restoring the data transmitted from the transmitter. Furthermore, when the lost sequence frame of the main frame 510 is also lost in the redundancy frame 550, the receiver recovers the sequence frame lost in the main frame 510 and the redundancy frame 550 through the XOR frame 580, thereby restoring the data transmitted from the transmitter.

More specifically, the receiver may decode the main frame 510 contained in the payload to restore the data transmitted from the transmitter. In this case, when the (n−w−3)-th sequence frame 512 of the main frame 510 is lost, the receiver decodes the redundancy frame 550 to check the (n−w−3)-th sequence frame 558 of the redundancy frame 550, and recovers the lost (n−w−3)-th sequence frame 512 of the main frame 510 with the (n−w−3)-th sequence frame 558 of the redundancy frame 550, thereby restoring the data transmitted from the transmitter. At this time, when the (n−w−3)-th sequence frame 558 of the redundancy frame 550 as well as the (n−w−3)-th sequence frame 512 of the main frame 510 is lost, the receiver decodes the XOR frame 580 to check the XOR1 frame 582 of the XOR frame 580. Then, through the XOR1 frame 582 corresponding to the result obtained by performing an XOR operation on the (n−w−3)-th sequence frame 512, the (n−w−2)-th sequence frame 514, and the (n−w−1)-th sequence frame 516 of the main frame 510, the receiver recovers the lost (n−w−3)-th sequence frame 512 of the main frame 510, thereby restoring the data transmitted from the transmitter. The lost (n−w−3)-th sequence frame 512 of the main frame 510 is recovered by performing an XOR operation on the (n−w−2)-th sequence frame 514 and the (n−w−1)-th sequence frame 516 of the main frame 510 and the XOR1 frame 582.

The decoded main frame 510 is inputted to a jitter buffer of a restoring unit included in the receiver, and the decoded redundancy frame 550 and the decoded XOR frame 580 are inputted to a recovery buffer of the restoring unit. As described above, the sequence frame lost in the decoded main frame 510 is recovered through the decoded redundancy frame 550 or the decoded XOR frame 580, and the Tx data contained in the payload are normally restored. Then, the receiver includes data packet reception information corresponding to the loss of the data packet and the recovery of the lost data packet, that is, loss information of the data packet into the mode field included in the payload of the data packet transmitted to the transmitter, and then transmits the data packet to the transmitter. Now, referring to FIG. 6, an apparatus which transmits the above-described data packet in the communication system in accordance with the embodiment of the present invention will be described in detail.

Figure 6:
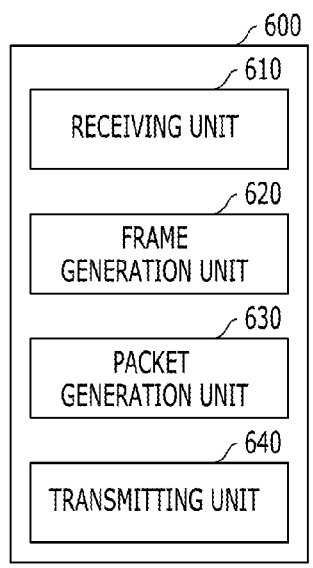
FIG. 6 is a diagram schematically illustrating the architecture of a transmitter in the communication system in accordance with the embodiment of the present invention.

FIG. 6 is a diagram schematically illustrating the architecture of a transmitter in the communication system in accordance with the embodiment of the present invention. FIG. 6 schematically illustrates an apparatus which dynamically generates frames of data corresponding to a multimedia service and one data packet including the frames according to heterogeneous networks or systems and transmits the data packet, when a terminal connects to the heterogeneous networks or systems, that is, a WLAN system or mobile communication network system and receives the multimedia service as described with reference to FIGS. 2 to 5.

Referring to FIG. 6, the transmitter 600 includes a receiving unit 610, a frame generation unit 620, a packet generation unit 630, and a transmitting unit 640. The receiving unit 610 is configured to receive information on the connection of the terminal to the WLAN system or mobile communication network system, a data packet transmitted from a receiver, and data packet reception information of the receiver. The frame generation unit 620 is configured to check the connection information, and dynamically generate a plurality of frames to be contained in a payload of a data packet in response to the connection to the WLAN system or the mobile communication network system. The packet generation unit 630 is configured to include the generated frames into the payload and generate one data packet. The transmitting unit 640 is configured to transmit the generated data packet to the receiver.

More specifically, the receiving unit 610 receives the information on the connection of the terminal to the WLAN system or the mobile communication network system, during a cell setting in which the terminal connects to the WLAN system or the mobile communication network system to receive the multimedia service. Furthermore, the receiving unit 610 receives a data packet from the receiver and receives data packet reception information of the receiver, that is, loss information of the data packet through a mode field contained in the payload of the received data packet.

The frame generation unit 620 generates a plurality of frames containing data to be transmitted to the receiver, that is, data corresponding to the multimedia service. At this time, the frame generation unit 320 dynamically generates frames of the data corresponding to the multimedia service, in response to the connection of the terminal to the WLAN system or the mobile communication network system. More specifically, when the terminal connects to the WLAN system, the frame generation unit 320 generates sequence frames of the data. When the terminal connects to the mobile communication network system, the frame generation unit 620 sets the number of frames and a sequence delay value w in consideration of the loss information of the data packet in the receiver, and generates a main frame and a redundancy frame or generates an XOR frame as well as the main frame and the redundancy frame, according to the frame number and the sequence delay value w.

The packet generation unit 630 includes the plurality of frames generated by the frame generation unit 620 into the payload and generates a data packet. At this time, the packet generation unit 630 includes information on the frames contained in the payload, that is, information indicating the number of frames into a mode field of the payload. The payload of the data packet may include the sequence frames or the main frame, the redundancy frame, and the XOR frame in response to the connection of the terminal to the WLAN system or the mobile communication network system, and may include the main frame and the redundancy frame according to the loss information of the data packet in the receiver.

The transmitting unit 640 transmits the data packet generated by the packet generation unit 630 to the receiver. The operation of dynamically generating the frames containing the data corresponding to the multimedia service in response to the connection of the terminal to the WLAN system or the mobile communication network system, the operation of generating the data packet containing the frames, the structure of the data packet, and the structures of the frames have already been described above. Thus, the detailed descriptions thereof are omitted herein. Now, referring to FIG. 7, an apparatus which receives the above-described data packet in the communication system in accordance with the embodiment of the present invention will be described in more detail.

Figure 7:
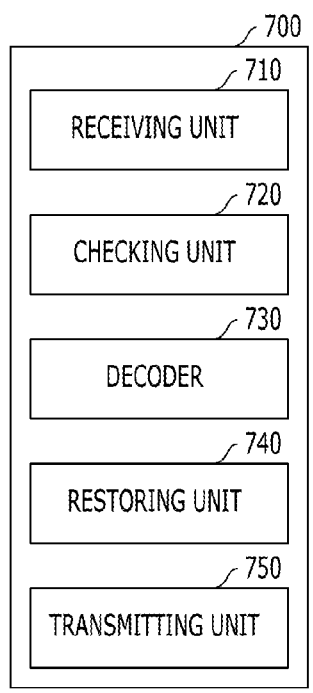
FIG. 7 is a diagram schematically illustrating the architecture of a receiver in the communication system in accordance with the embodiment of the present invention.

FIG. 7 is a diagram schematically illustrating the architecture of a receiver in the communication system in accordance with the embodiment of the present invention. FIG. 7 schematically illustrates an apparatus which receives one data packet, when frames of data corresponding to a multimedia service are dynamically generated according to heterogeneous networks or systems and then transmitted as the data packet such that a terminal connects to the heterogeneous networks or systems, that is, a WLAN system or mobile communication network system and receives the multimedia service as described above with reference to FIGS. 2 to 5.

Referring to FIG. 7, the receiver 700 includes a receiving unit 710, a checking unit 720, a decoder 730, a restoring unit 740, and a transmitting unit 750. The receiving unit 710 is configured to receive a data packet transmitted from a transmitter. The checking unit 720 is configured to check control information contained in a header of the received data packet and field information contained in a mode field of a payload of the received data packet. The decoder 730 is configured to decode a plurality of frames included in the payload. The restoring unit 740 is configured to recover a frame lost in the decoded frames and restore the data transmitted from the transmitter. The transmitting unit 750 is configured to transmit data packet reception information corresponding to the lost frame, that is, loss information of the data packet to the transmitter, and transmit information on connection of a terminal to the WLAN system or mobile communication network system to the transmitter, during a cell setting in which the terminal connects to the WLAN system or mobile communication system to receive the multimedia service.

More specifically, the receiving unit 710 receives a data packet transmitted from the transmitter as described with reference to FIG. 6. That is, the receiving unit 710 receives the data packet containing the data corresponding to the multimedia service in response to the connection of the terminal to the WLAN system or mobile communication network system. The data packet includes a header and a payload, and the payload includes a mode field and a plurality of frames containing the data.

The checking unit 720 checks the control information contained in the header, and checks the field information contained in the mode field of the payload, that is, information on the plurality of frames included in the payload, for example, information on the number of frames. In other words, the checking unit 720 checks the size of the payload, the number of frames, the length of the frames, and start points of the frames in the payload, through the information contained in the header and the information contained in the mode field. The checking unit 720 checks whether sequence frames are contained in the payload or a main frame, a redundancy frame, and an XOR frame are contained in the payload, in response to the connection of the terminal to the WLAN system or mobile communication network system.

The decoder 730 decodes the frames contained in the payload based on the information checked through the checking unit 720. The decoder 730 decodes sequence frames contained in the payload or decodes a main frame in the frames contained in the payload. Then, the decoder 730 decodes a redundancy frame when a lost sequence frame exists in the decoded main frame, and decodes the XOR frame when the lost sequence frame is also lost in the decoded redundancy frame. Then, the decoded frames are inputted to a jitter buffer and a recovery buffer of the restoring unit 740.

The restoring unit 740 recovers the lost sequence frame in the sequence frames, and restores the data transmitted from the transmitter, that is, the data corresponding to the multimedia service. Furthermore, the restoring unit 740 checks the lost sequence frame in the decoded main frame. When the lost sequence frame exists, the restoring unit 740 recovers the lost sequence frame with a sequence frame corresponding to the lost sequence frame in the decoded redundancy frame. When the lost sequence frame is also lost in the decoded redundancy frame, the restoring unit 740 recovers the lost sequence frame through the XOR frame, and restores the data transmitted from the transmitter, that is, the data corresponding to the multimedia service.

Figure 8:
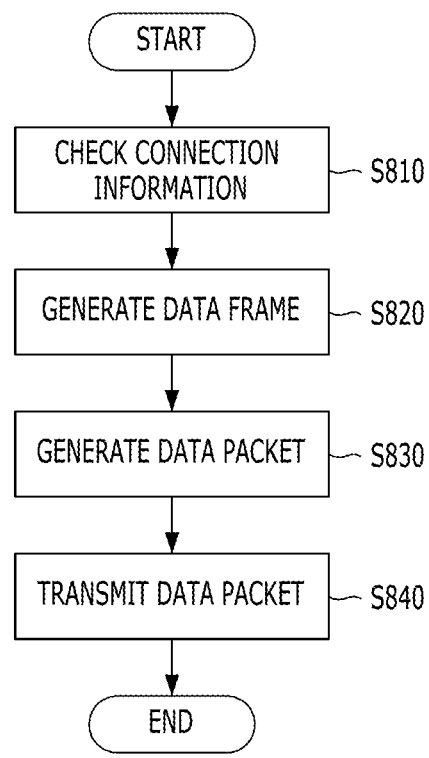
FIG. 8 schematically illustrates a process in which a transmitter transmits a data packet in the communication system in accordance with the embodiment of the present invention.

The transmitting unit 750 transmits a data packet which the receiver 700 will transmit to the transmitter. At this time, the transmitting unit 750 includes the data packet reception information of the receiver 700, that is, the loss information of the data packet corresponding to the data packet loss of the receiver 700 and the recovery of the lost data packet into a mode field of a payload of the data packet, and then transmits the data packet to the transmitter. The structure of the data packet received from the transmitter in response to the connection of the terminal to the WLAN system or mobile communication network system and the structures of the frames contained in the payload of the data packet, that is, the sequence frames or the main frame, the redundancy frame, and the XOR frame have already been described above. Thus, the detailed descriptions thereof are omitted herein. Now, referring to FIG. 8, an operation of transmitting the above-described data packet in the communication system in accordance with the embodiment of the present invention will be described in detail. FIG. 8 schematically illustrates a process in which a transmitter transmits a data packet in the communication system in accordance with the embodiment of the present invention.

Referring to FIG. 8, the transmitter checks information on connection of a terminal to a WLAN system or mobile communication network system, during a call setup in which the terminal connects to heterogeneous networks or systems, that is, the WLAN system or mobile communication network system, at step S810. Then, the transmitter checks a data packet received from the receiver and data packet reception information of the receiver. At this time, the transmitter checks the data packet reception information of the receiver, that is, loss information of the data packet through a mode field contained in the payload of the data packet received from the receiver.

The transmitter dynamically generates a plurality of frames containing data to be transmitted to the transmitter, that is, data corresponding to a multimedia service, in response to the connection of the terminal to the WLAN system or mobile communication system, at step S820. When the terminal connects to the WLAN system, the transmitter generates sequence frames of the data, and when the terminal connects to the mobile communication network system, the transmitter sets the number of frames and a sequence delay value w in consideration of loss information of the data packet in the receiver, and generates a main frame and a redundancy frame or an XOR frame as well as the main frame and the redundancy frame according to the set frame number and w.

The transmitter includes the generated frames into a payload and generates a data packet, at step S830. At this time, the transmitter includes information on the frames contained in the payload, or particularly, information on the number of frames into a mode field of the payload. The payload of the data packet may include the sequence frames or the main frame, the redundancy frame, and the XOR frame, in response to the connection of the terminal to the WLAN system or mobile communication network system, or may include the main frame and the redundancy frame according to the loss information of the data packet in the receiver.

The transmitter transmits the generated data packet to the receiver at step S840. The operation of dynamically generating the frames containing data corresponding to the multimedia service in response to the connection of the terminal to the WLAN system or mobile communication network system, the operation of generating the data packet including the frames, the structure of the data packet, and the structures of the frames have already been described above. Thus, the detailed descriptions thereof are omitted herein. Now, referring to FIG. 9, an operation of receiving the above-described data packet in the communication system in accordance with the embodiment of the present invention will be described in more detail.

Figure 9:
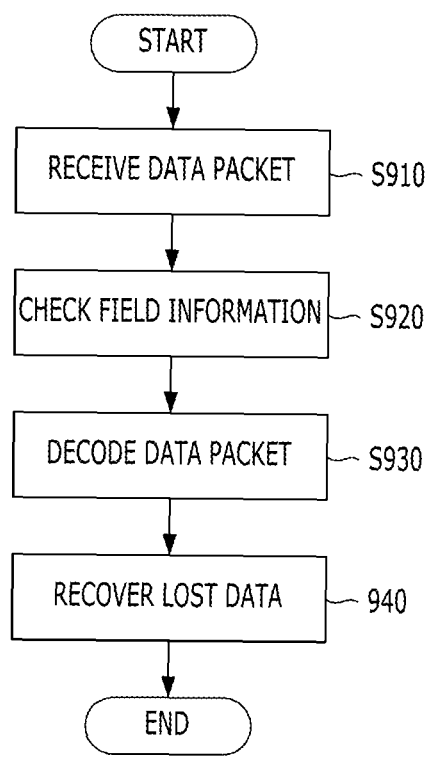
FIG. 9 schematically illustrates a process in which a receiver receives a data packet in the communication system in accordance with the embodiment of the present invention.

FIG. 9 schematically illustrates a process in which a receiver receives a data packet in the communication system in accordance with the embodiment of the present invention.

Referring to FIG. 9, the receiver receives a data packet transmitted from a transmitter, that is, a data packet containing data corresponding to a multimedia service, at step S910. The receiver receives the data packet containing the data corresponding to the multimedia service in response to connection of a terminal to a WLAN system or mobile communication network system, such that the terminal connects to heterogeneous networks or systems, that is, the WLAN system or mobile communication network system and receives the multimedia service. The data packet includes a header and a payload, and the payload includes a mode field and a plurality of frames containing the data.

The receiver checks control information contained in the header, and checks field information contained in the mode field of the payload, that is, information on the plurality of frames contained in the payload, for example, information on the number of frames, at step S920. In other words, the receiver checks the size of the payload, the number of frames, the length of the frames, and start points of the frames in the payload, through the information contained in the header and the information contained in the mode field. That is, the receiver checks whether the sequence frames are contained in the payload or a main frame, a redundancy frame, and an XOR frame are contained in the payload, in response to the connection of the terminal to the WLAN system or mobile communication network system.

The receiver decodes the frames contained in the payload, based on the checked information, at step S930. The receiver decodes sequence frames contained in the payload or decodes the main frame in the frames contained in the payload. Then, the receiver decodes the redundancy frame when a lost sequence frame exists in the decoded main frame, and decodes the XOR frame when the sequence frame is also lost in the decoded redundancy frame.

The receiver recovers the lost sequence frame in the sequence frames, thereby restoring the data transmitted from the transmitter, that is, the data corresponding to the multimedia service, at step S940. Furthermore, the receiver checks whether or not a lost sequence frame exists in the decoded main frame. When the lost sequence frame exists, the receiver recovers the lost sequence frame with a sequence frame corresponding to the lost sequence frame in the decoded redundancy frame, and when the lost sequence frame is also lost in the decoded redundancy frame, the receiver recovers the lost sequence frame through the XOR frame, thereby restoring the data transmitted from the transmitter, that is, the data corresponding to the multimedia service. The structure of the data packet received from the transmitter in response to the connection of the terminal to the WLAN system or mobile communication network system and the structures of the frames included in the payload of the data packet, that is, the sequence frames or the main frame, the redundancy frame, and the XOR frame have already been described above. Thus, the detailed descriptions thereof are omitted herein.

In the communication system in accordance with the embodiment of the present invention, when a terminal connects to heterogeneous networks or systems, that is, a WLAN system or mobile communication system and receives a multimedia service, the transmitter dynamically generates frames of data corresponding to the multimedia service and one data packet including the frames according to the heterogeneous networks or systems. At this time, a payload of the data packet may include sequence frames or a main frame, a redundancy frame, and an XOR frame according to the heterogeneous networks or systems, or may include the main frame and the redundancy frame according to loss information of the data packet in the receiver. Furthermore, information on the frames contained in the payload, that is, information indicating that the sequence frames are contained in the payload or the main frame, the redundancy frame, and the XOR frame are contained in the payload or information indicating the number of frames is contained in the mode field of the payload, and information on the payload is contained in the header of the data packet.

Furthermore, in the communication system in accordance with the embodiment of the present invention, the receiver receives a data packet transmitted in response to the connection of the terminal to heterogeneous networks or systems, that is, the WLAN system or mobile communication system. Then, the receiver decodes sequence frames contained in a payload of the data packet, and recovers a lost sequence frame in the decoded sequence frames, thereby restoring the data transmitted from the transmitter, that is, the data corresponding to the multimedia service. Furthermore, the receiver decodes a main frame in the frames included in the payload of the data packet. Then, the receiver decodes a redundancy frame when a lost sequence frame exists in the decoded main frame, and decodes an XOR frame when the lost sequence frame is also lost in the decoded redundancy frame. Furthermore, the receiver checks the lost sequence frame in the decoded main frame. When the lost sequence frame exists, the receiver recovers the lost sequence frame with a sequence frame corresponding to the lost sequence frame in the decoded redundancy frame, and when the lost sequence frame is also lost in the decoded redundancy frame, the receiver recover the lost sequence frame through the XOR frame, thereby restoring the data transmitted from the transmitter, that is, the data corresponding to the multimedia service.

In accordance with the embodiments of the present invention, when a terminal connects to heterogeneous networks or systems to receive a multimedia service in the communication system, a lost packet may be dynamically recovered in response to the heterogeneous networks or systems. Thus, when the multimedia service is provided to the terminal through the heterogeneous networks or systems, the lost data packet may be efficiently recovered, which makes it possible to improve the transmission/reception efficiency of the data.

Furthermore, the apparatus and method in accordance with the embodiments of the present invention does not require a recovery delay time of a lost data packet of a multimedia service in the communication system, adds redundancy data to main data so as to recover the lost data packet. When media are transmitted between communication terminals, a random or burst packet loss which may occur through a wired/wireless network during the media transmission between the communication terminals may be recovered in real time without a retransmission process. Thus, when the media are reproduced, a delay and loss may be reduced to thereby improve a quality.

While the present invention has been described with respect to the specific embodiments, it will be apparent to those skilled in the art that various changes and modifications may be made without departing from the spirit and scope of the invention as defined in the following claims.

What is claimed is:

1. An apparatus for transmitting data in a communication system, comprising:
a receiving unit configured to receive connection information of network systems to which a terminal connects;
a packet generation unit configured to check the connection information, generate a data packet having a first structure when the terminal connects to a first system, and generate a data packet having a second structure when the terminal connects to a second system; and
a transmitting unit configured to transmit the data packets to a receiver,
wherein the data packet having the first structure comprises successive sequence frames, and
the data packet having the second structure comprises a main frame including the sequence frames, a redundancy frame obtained by delaying the sequence of the sequence frames, and an exclusive OR (XOR) frame of the main frame.

2. The apparatus of claim 1, further comprising a frame generation unit configured to generate the sequence frames containing data corresponding to the terminal when the terminal connects to the first system, and generate the main frame containing the data, the redundancy frame, and the XOR frame when the terminal connects to the second system.

3. The apparatus of claim 1, wherein the data packets comprise a header and a payload containing the sequence frames or the main frame, the redundancy frame, and the XOR frame, and
the payload comprises the frames and a mode field containing information on the frames.

4. The apparatus of claim 3, wherein the mode field contains information indicating that the sequence frames are contained or the main frame, the redundancy frame, and the XOR frame are contained, and information indicating the number of frames.

5. The apparatus of claim 4, wherein the mode field contains sequence delay information of the sequence frames in the redundancy frame.

6. The apparatus of claim 1, wherein when a loss ratio for the data packets in the receiver is smaller than a threshold value, the data packet having the second structure includes the main frame and the redundancy frame in a payload.

7. The apparatus of claim 6, wherein when the loss ratio is greater than the threshold value, the data packet having the second structure includes the main frame, the redundancy frame, and the XOR frame in the payload.

8. The apparatus of claim 6, wherein the redundancy frame obtained by delaying the sequence of the sequence frames of the main frame is generated depending on the loss ratio.

9. The apparatus of claim 1, wherein the XOR frame comprises frames obtained by performing an XOR operation on a predetermined number of adjacent sequence frames in the sequence frames of the main frame.

10. An apparatus for receiving data in a communication system, comprising:

a receiving unit configured to receive a data packet, generated in response to network systems to which a terminal connects, from a transmitter;

a checking unit configured to check control information contained in a header of the data packet and information on a plurality of frames contained in a payload of the data packet;

a decoder configured to decode the plurality of frames contained in the payload; and a restoring unit configured to restore the data transmitted from the transmitter through the decoded frames, wherein the receiving unit receives the data packet including successive sequence frames when the terminal connects to a first system, and receives the data packet including a main frame including the sequence frames, a redundancy frame obtained by delaying the sequence of the sequence frames, and an XOR frame of the main frame when the terminal connects to a second system.

11. The apparatus of claim 10, wherein the data packet comprises a header and a payload including the sequence frames or the main frame, the redundancy frame, and the XOR frame, and the payload comprises the frames and a mode field containing information on the frames.

12. The apparatus of claim 11, wherein the mode field contains information indicating that the sequence frames are contained or the main frame, the redundancy frame, and the XOR frame are contained, and information indicating the number of frames.

13. The apparatus of claim 12, wherein the checking unit checks the size of the payload, the lengths of the respective frames, and starts point of the respective frames in the payload, through the header and the mode field.

14. The apparatus of claim 10, wherein the decoder decodes the sequence frames, and the restoring unit recovers a lost sequence frame in the decoded sequence frames.

15. The apparatus of claim 10, wherein the decoder decodes the main frame, and then decodes the redundancy frame in the plurality of frames when a lost sequence frame exists in the sequence frames of the decoded main frame, and the restoring unit recovers the lost sequence frame with a sequence frame corresponding to the lost sequence frame in the decoded redundancy frame.

16. The apparatus of claim 15, wherein the decoder decodes the XOR frame when a sequence frame corresponding to the lost sequence frame is lost in the decoded redundancy frame, and the restoring unit recovers the lost sequence frame by performing an XOR operation on an XOR operation result frame corresponding to the lost sequence frame in the decoded XOR frame and sequence frames adjacent to the lost sequence frame in the decoded main frame.

17. A method for transmitting/receiving data in a communication system, comprising:

receiving connection information of network systems to which a terminal connects;

checking the connection information and dynamically generating a data packet in response to the connection of the terminal to the network systems; and transmitting the data packet to a receiver, wherein said checking the connection information and dynamically generating the data packet in response to the connection of the terminal to the network system comprises:

generating the data packet containing successive sequence frames when the terminal connects to a first system; and generating the data packet containing a main frame including the sequence frames, a redundancy frame obtained by delaying the sequence of the sequence frames, and an XOR frame of the main frame, when the terminal connects to a second system.

18. The method of claim 17, wherein said checking the connection information and dynamically generating the data packet in response to the connection of the terminal to the network system comprises generating the data packet including the main frame and the redundancy frame when a loss ratio for the data packet in the receiver is smaller than a threshold value and generating the data packet including the main frame, the redundancy frame, and the XOR frame when the loss ratio is greater than the threshold value.

19. The method of claim 17, further comprising:

receiving the data packet, and then decoding the sequence frames contained in the data packet; and recovering a lost sequence frame in the decoded sequence frames.

20. The method of claim 17, further comprising:

receiving the data packet, and then decoding the main frame contained in the data packet;

decoding the redundancy frame when a lost sequence frame exists in the sequence frames of the decoded main frame;

decoding the XOR frame when a sequence frame corresponding to the lost sequence frame is lost in the decoded redundancy frame;

recovering the lost sequence frame with a sequence frame corresponding to the lost sequence frame in the decoded redundancy frame; and recovering the lost sequence frame by performing an XOR operation on an XOR operation result frame corresponding to the lost sequence frame in the decoded XOR frame and sequence frames adjacent to the lost sequence frame in the decoded main frame.

\* \* \* \* \*